US009328728B2

(12) United States Patent  
Stuermer

(10) Patent No.: US 9,328,728 B2  
(45) Date of Patent: May 3, 2016

(54) HYDROSTATIC POSITIVE DISPLACEMENT MACHINE

(71) Applicant: Linde Hydraulics GmbH & Co. KG, Aschaffenburg (DE)

(72) Inventor: Burkhard Stuermer, Kleinostheim (DE)

(73) Assignee: Linde Hydraulics GmbH & Co. KG, Aschaffenburg (DE)

( * ) Notice: Subject to any disclaimer, the term of this patent is extended or adjusted under 35 U.S.C. 154(b) by 362 days.

(21) Appl. No.: 13/897,654

(22) Filed: May 20, 2013

(65) Prior Publication Data

US 2014/0154104 A1 Jun. 5, 2014

(30) Foreign Application Priority Data

Jun. 1, 2012 (DE) .......................... 10 2012 104 755

(51) Int. Cl.

| F04B 49/12 | (2006.01) |
| F04B 1/26 | (2006.01) |
| F04B 17/05 | (2006.01) |
| F16H 61/433 | (2010.01) |

(52) U.S. Cl.
CPC . *F04B 49/12* (2013.01); *F04B 1/26* (2013.01); *F04B 17/05* (2013.01); *F16H 61/433* (2013.01)

(58) Field of Classification Search
CPC ............ F04B 1/26; F04B 17/05; F04B 49/12; F16H 61/433
USPC ............................ 417/213, 222.1; 92/13, 172
See application file for complete search history.

(56) References Cited

U.S. PATENT DOCUMENTS

| 4,543,787 | A | * | 10/1985 | Eckhardt ......................... 60/444 |
| 5,184,466 | A | * | 2/1993 | Schniederjan ........ F16H 61/421 |
| | | | | 60/448 |
| 6,915,631 | B2 | * | 7/2005 | Kado ................... F16H 61/438 |
| | | | | 60/394 |
| 7,927,060 | B2 | * | 4/2011 | Biggerstaff et al. .......... 414/408 |
| 2009/0269214 | A1 | * | 10/2009 | Steigerwald et al. ......... 417/212 |
| 2009/0269215 | A1 | * | 10/2009 | Steigerwald et al. ......... 417/212 |

FOREIGN PATENT DOCUMENTS

DE 4002017 A1 7/1991

* cited by examiner

*Primary Examiner* — Nathan J Newhouse  
*Assistant Examiner* — Conner Tremarche  
(74) *Attorney, Agent, or Firm* — The Webb Law Firm

(57) ABSTRACT

A hydrostatic positive displacement machine (2) is operated in a closed circuit and delivers hydraulic fluid into a working circuit. The displacement volume is varied by a control device (6) having a variable displacement piston device (7). The machine (2) has a swivel-back device (40) which, in the event of a decrease of the feed pressure from the feed pressure source (11), guarantees actuation of the machine (2) toward a reduction of the displacement volume. The swivel-back device (40) includes at least one pressure sequence valve (41), which is in communication on the input side with the working circuit of the machine (2). In the event of a decrease in the feed pressure from the feed pressure source (11) below a limit pressure, the pressure sequence valve (41) makes it possible to supply the control device (6) of the machine (2) with hydraulic fluid from the working circuit.

16 Claims, 5 Drawing Sheets

HYDROSTATIC POSITIVE DISPLACEMENT MACHINE

CROSS REFERENCE TO RELATED APPLICATION

This application claims priority to German Application DE 102012104755.3 filed Jun. 1, 2012, which is herein incorporated by reference in its entirety.

BACKGROUND OF THE INVENTION

1. Field of the Invention

This invention relates to a hydrostatic positive displacement machine, in particular an axial piston machine with variable displacement volume, which can be operated in a closed circuit and delivers hydraulic fluid into a working circuit. The displacement volume can be adjusted by means of a control device which comprises a variable displacement piston device which is provided with a first control pressure chamber and a second control pressure chamber. The variable displacement piston device is in an operational connection with a displacement volume control mechanism, in particular a swashplate, whereby the control pressure chambers of the variable displacement piston device can be connected by means of a control valve with a feed pressure source or can be relieved to a reservoir. The positive displacement machine and the feed pressure source are driven by a drive machine, such as an internal combustion engine. The positive displacement machine has a swivel-back device which, in the event of a decrease in the feed pressure from the feed pressure source, guarantees the actuation of the positive displacement machine toward a reduction of the displacement volume.

2. Description of Related Art

Hydrostatic positive displacement machines with variable displacement volume which are operated in a closed circuit are used as pumps, e.g., in traction drives of mobile industrial trucks. The displacement volume of the positive displacement machine thereby determines the speed of travel of the work machine.

A control device is provided to set the displacement volume of the positive displacement machine. The control device has a variable displacement piston device which is in an operative connection with a displacement volume control mechanism that determines the displacement volume, for example a swashplate with a variable tilt, of a displacement machine in the form of an axial piston machine utilizing a swashplate construction. For the actuation of the variable displacement piston device, there is a control valve, for example an actuating pressure control valve, which is in communication with a feed pressure source and a reservoir and controls the actuation of the control pressure chambers of the variable displacement piston device with an actuating pressure generated from the feed pressure of the feed pressure source. The control device, which is acted on by the actuating pressure in the control pressure chamber, then generates an actuating torque on the displacement volume control mechanism which, together with an intrinsic torque of the displacement volume control mechanism which is generated from the forces acting on the piston of the positive displacement machine, produces the desired adjustment of the displacement volume control mechanism. The control valve in the form of an actuating pressure control valve is generally a position-controlled pilot valve which is actuated by an actuator signal which specifies a value for the displacement volume and to which the current position of the displacement volume control mechanism is fed back. The control device of the positive displacement machine for the adjustment of the displacement volume is a position feedback control.

The positive displacement machine and the feed pressure source, which is generally formed by a feed pressure pump and generates a constant feed pressure, are driven jointly by a drive machine, such as an internal combustion engine. The feed pressure pump is generally a constant displacement pump with a fixed displacement volume so that the delivery of the feed pump is proportional to the speed of rotation of the drive machine.

At low drive speeds of rotation of the drive machine and, therefore, the accompanying low feed volume flow of the feed pressure pump, there can be a drop or decline of the feed pressure of the feed pressure pump. On account of the drop in the feed pressure, when the control valve is actuated, operating conditions can occur on account of the reduced forces in the control pressure chamber of the variable displacement piston device in which the adjustment of the displacement volume control mechanism with the position control circuit can no longer be guaranteed and the positive displacement machine no longer operates with the intended positive ratio of actuating torque moment and the intrinsic torque.

In the event of a reduction in the speed of rotation of the drive machine and, therefore, an overloading of the drive machine, it is no longer possible to guarantee a desired adjustment of the displacement volume control mechanism toward a reduction of the displacement volume. Under some conditions, the result can be an adjustment of the displacement volume control mechanism toward an increase of the displacement volume by the intrinsic torque, as a result of which the drive machine can stall.

When a positive displacement machine of this type is used as a pump in a hydrostatic traction drive of a mobile work machine, such as a wheel loader, this type of stalling of the drive machine in the form of an internal combustion engine can occur under operating conditions in which the shovel is driven into a pile of debris and the hydraulic working system is also loaded, for example to tip or raise the shovel. Under these conditions, there can be a reduction in the speed of rotation of the drive machine with a corresponding decline or drop of the feed pressure. As a result of which, an additional load can be placed on the drive machine which leads to the stalling of the drive machine because, on account of the reduced feed pressure and the intrinsic torque, the displacement volume control mechanism of the positive displacement machine can no longer be adjusted in the direction of a reduction of the displacement volume to reduce the load on the drive machine.

To guarantee the adjustment of the displacement volume control mechanism under all operating conditions in the direction of a reduction of the displacement volume, the known art describes providing a reverse swiveling device with corresponding springs on the variable displacement piston which, in the event of a decline or drop in the feed pressure, applies a correspondingly high spring pressure to apply pressure to the variable displacement piston device and, thus, the displacement volume control mechanism toward a neutral position with a displacement volume of zero and, thus, toward a reduction of the displacement volume. A positive displacement machine with a reverse swiveling device is known, for example, from DE 40 02 017 A1. However, on account of the high spring forces on the variable displacement piston device, a reverse swiveling device of this type entails a great deal of construction effort and expense because the return forces of the springs, even in normal operation of the positive displacement machine, must be overcome when the displacement volume control mechanism is swiveled out by the control pressure present in the control pressure chamber of the variable displacement piston device, which means that a correspondingly high actuating pressure level is required, with correspondingly large actuating pressure chambers on the variable displacement piston device.

An object of this invention is to provide a positive displacement machine of the general type described above but with which, in the event of a drop in the feed pressure, a reliable adjustment of the displacement volume control mechanism toward a reduction of the displacement volume can be achieved at small expense in terms of time, materials, cost, and effort.

SUMMARY OF THE INVENTION

The invention teaches that the swivel-back device comprises at least one pressure sequence valve which is connected on the input side with the working circuit of the positive displacement machine. In the event of a drop in the feed pressure of the feed pressure source below a limit pressure, the pressure sequence valve makes it possible to supply the control device of the positive displacement machine with hydraulic fluid from the working circuit. The teaching of the invention is to provide a swivel-back device with a pressure sequence valve which, in the event of a decline or drop of the feed pressure from the feed pressure source, supplies the control device with hydraulic fluid from the working circuit of the positive displacement machine so that, in the event of a decline or drop of the feed pressure, a volume flow can be easily extracted from the working circuit of the positive displacement machine with the pressure sequence valve. This ensures that the displacement volume control mechanism is varied toward a reduction of the displacement volume. With a pressure sequence valve of this type, by means of the extraction of a volume flow from the working circuit of the positive displacement machine to supply the control device without increasing the spring force of the springs on the variable displacement piston device, the adjustment of the displacement volume control mechanism toward a reduction of the displacement volume can be guaranteed in the event of a reduction in the speed of the drive machine and a resulting decrease of the feed pressure from the feed pressure source, so that a stalling of the drive machine can be effectively prevented in the event of a drop in the feed pressure.

On the positive displacement machine of the invention, the pressure sequence valve is intended to be active only in the event of a decline and, thus, a corresponding drop in the feed pressure to guarantee the adjustment of the displacement volume control mechanism toward a reduction of the displacement volume by connecting the control device with the working circuit of the positive displacement machine. For this purpose, in one advantageous configuration of the invention, if the feed pressure of the feed pressure source is above the limit pressure, the pressure sequence valve closes the connection of the working circuit with the feed pressure source and the control device is supplied with hydraulic fluid by the feed pressure source. Therefore, when the feed pressure is sufficient, the pressure sequence valve is not active and the control device is supplied with hydraulic fluid from the feed pressure source.

This functionality of the pressure sequence valve can be achieved with little additional effort in terms of cost, materials, and labor if, as in one advantageous configuration of the invention, the pressure sequence valve is actuated by the feed pressure of the feed pressure source toward a closed position in which the connection between the working circuit and the control device is blocked, and is actuated by the pressure of the working circuit toward an open position in which the working circuit is connected with the control device.

In one configuration of the invention, the pressure sequence valve is connected on the output side with a feed pressure supply line that leads from the feed pressure source to the control valve. When the actuated pressure sequence valve is in the open position and there is a corresponding decrease and drop in the feed pressure, the pressure in the connection between the feed pressure supply line and the working circuit of the positive displacement machine is supplemented by a volume flow from the working circuit of the positive displacement machine, by means of the pressure sequence valve in the feed pressure supply line so that the feed pressure at the control valve is maintained by the volume flow from the working circuit by means of the pressure sequence valve. When the control valve is actuated accordingly, with the volume flow from the working circuit, the supply of hydraulic fluid to the variable displacement piston device can be easily ensured via the control valve and the adjustment of the displacement volume control mechanism of the variable displacement unit toward a reduction of the displacement volume. Generally, on positive displacement machines of this type, the feed pressure level of the feed pressure is lower than the working pressure in the working circuit, so that the variable displacement piston device is not designed for the higher pressures of the working circuit. With the output-side connection of the pressure sequence valve to the feed pressure supply line, it is easily possible, when the pressure sequence valve is in the open position, to report back the pressure generated by the pressure sequence valve on the output side to the pressure sequence valve and to actuate the pressure sequence valve toward the closed position, so that the pressure generated in the open position by the pressure sequence valve from the working circuit and applied to the variable displacement piston device can be easily limited to the level of the feed pressure, thereby easily preventing an overloading of the variable displacement piston device.

In an alternative configuration of the invention, the pressure sequence valve is connected on the output side with a control pressure chamber of the variable displacement piston device that acts in the direction of a reduction of the displacement volume. With the pressure sequence valve in the open position, when there is a decline and drop of the feed pressure, as a result of the connection of the control pressure chamber of the variable displacement piston device with the working circuit of the positive displacement machine by means of the pressure sequence valve, the variable displacement piston is acted on directly with a volume flow extracted from the working circuit, so that the adjustment of the displacement volume control mechanism of the variable displacement unit toward a reduction of the displacement volume is guaranteed in a simple manner.

For this purpose, in one advantageous development of the invention, the pressure sequence valve is connected on the output side to a control pressure line which is connected with the control pressure chamber, which line is connected by means of the control valve with a reservoir. It is thereby easily possible to transport a volume flow supplied from the working circuit of the positive displacement machine to the control pressure chamber of the variable displacement piston device by means of the pressure sequence valve that acts in the direction of a reduction of the displacement volume, which volume flow guarantees the adjustment of the displacement volume control mechanism of the displacement unit toward a reduction of the displacement volume.

For this purpose, the pressure sequence valve can alternatively be connected on the output side to a discharge line of the control valve which is connected with the reservoir. Because, when the control valve is actuated accordingly, the discharge line is connected with the control pressure chamber of the variable displacement piston device that acts toward a reduction of the displacement volume. When the pressure sequence valve is open, a volume flow supplied from the working circuit of the positive displacement machine can be transported to the control pressure chamber of the variable displacement piston device that acts toward a reduction of the displacement volume, which volume flow guarantees the adjustment of the displacement volume control mechanism of the displacement unit toward a reduction of the displacement volume.

To be able to generate a corresponding control pressure, which is present at the control pressure chamber and adjusts the variable displacement piston device toward a reduction of the displacement volume, in one development of the invention, a throttling device is located in the control pressure line or the outlet line to build up a control pressure that acts toward the reduction of the displacement volume. With the pressure sequence valve in the open position, a control pressure is therefore built up by means of the throttling device in the control pressure line which is connected with the reservoir, which control pressure is available to the control pressure chamber of the variable displacement piston device that acts toward a reduction of the displacement volume. With a throttling device of this type, it is therefore easily possible to build up, from the working circuit of the positive displacement machine, a control pressure which guarantees the actuation of the displacement volume control mechanism toward a reduction of the displacement volume.

With a pressure sequence valve of this type which is connected on the output side with the control pressure chamber of the variable displacement piston device that acts toward the reduction of the displacement volume, a limitation of the pressure generated by the pressure sequence valve in the open position and acting on the variable displacement piston device can be achieved if the pressure generated on the output side of the pressure sequence valve is returned to the pressure sequence valve and actuates this valve into the closed position. Therefore, an overloading of the variable displacement piston device can easily be prevented by the pressure generated by means of the pressure sequence valve from the working circuit.

In one alternative embodiment, a limitation of the pressure generated from the working circuit by the pressure sequence valve in the open position and impinging on the variable displacement piston device can be achieved if the pressure sequence valve is impinged upon on the input side by means of a throttling device with the hydraulic fluid from the working circuit. The throttling device which is located in the input side, together with the throttling device which is located in the control pressure line or in the discharge line, forms a pressure divider circuit with which, in the open position of the pressure sequence valve, which is connected on the output side with the control pressure chamber of the variable displacement piston device acting toward the reduction of the displacement volume, it is possible to achieve a limitation of the pressure generated by the pressure sequence valve in the open position from the working circuit and impinging on the variable displacement piston device. With a pressure divider circuit of this type it is also possible to easily prevent an overloading of the variable displacement piston device by the pressure generated by means of the pressure sequence valve from the working circuit.

In one advantageous configuration of the invention, the positive displacement machine is a pump that can be adjusted in both directions and which is operated in a closed circuit. The swivel-back device is active in one direction of swiveling or in both directions of swiveling of the pump. With a pump that can be swiveled in both directions, starting from a neutral position with the delivery zero, a user that operates in a closed circuit can be operated in both directions of movement. If the intent here is to ensure that the pump swivels back toward the neutral position in the event of a drop in the feed pressure in only one direction of movement of the user, the swivel-back device of the invention is active in only one direction of rotation, for example by means of a single pressure sequence valve which for the selected direction of movement is in communication with the corresponding high pressure side of the user. If the intent is to ensure, in both directions of movement of the user, a swiveling back of the pump toward the neutral position in the event of a drop in the feed pressure, that can be achieved with a swivel-back device of the type of the invention which is active in both directions of swiveling, for example by means of two pressure sequence valves, each of which is in connection for a specified direction of movement with the corresponding high pressure side of the circuit, or with a single pressure sequence valve which is connected for both directions of movement with the corresponding high pressure sides of the user.

The invention further relates to a hydrostatic traction drive with a positive displacement machine in the form of a pump with a swivel-back device of the invention and a mobile work machine with a hydrostatic traction drive of this type. On a mobile work machine with a hydrostatic traction drive, with the swivel-back device of the invention, in the event of a decline and therefore a corresponding drop in the feed pressure source which is supplying the pump with hydraulic fluid, a swiveling of the pump back in the direction of a reduction of the delivery can be guaranteed to prevent a stalling of the drive motor.

BRIEF DESCRIPTION OF THE DRAWINGS

Additional advantages and details of the invention are explained in greater detail below with reference to the accompanying schematic figures in which like reference numbers identify like parts throughout.

DESCRIPTION OF THE PREFERRED EMBODIMENTS

Figure 1:
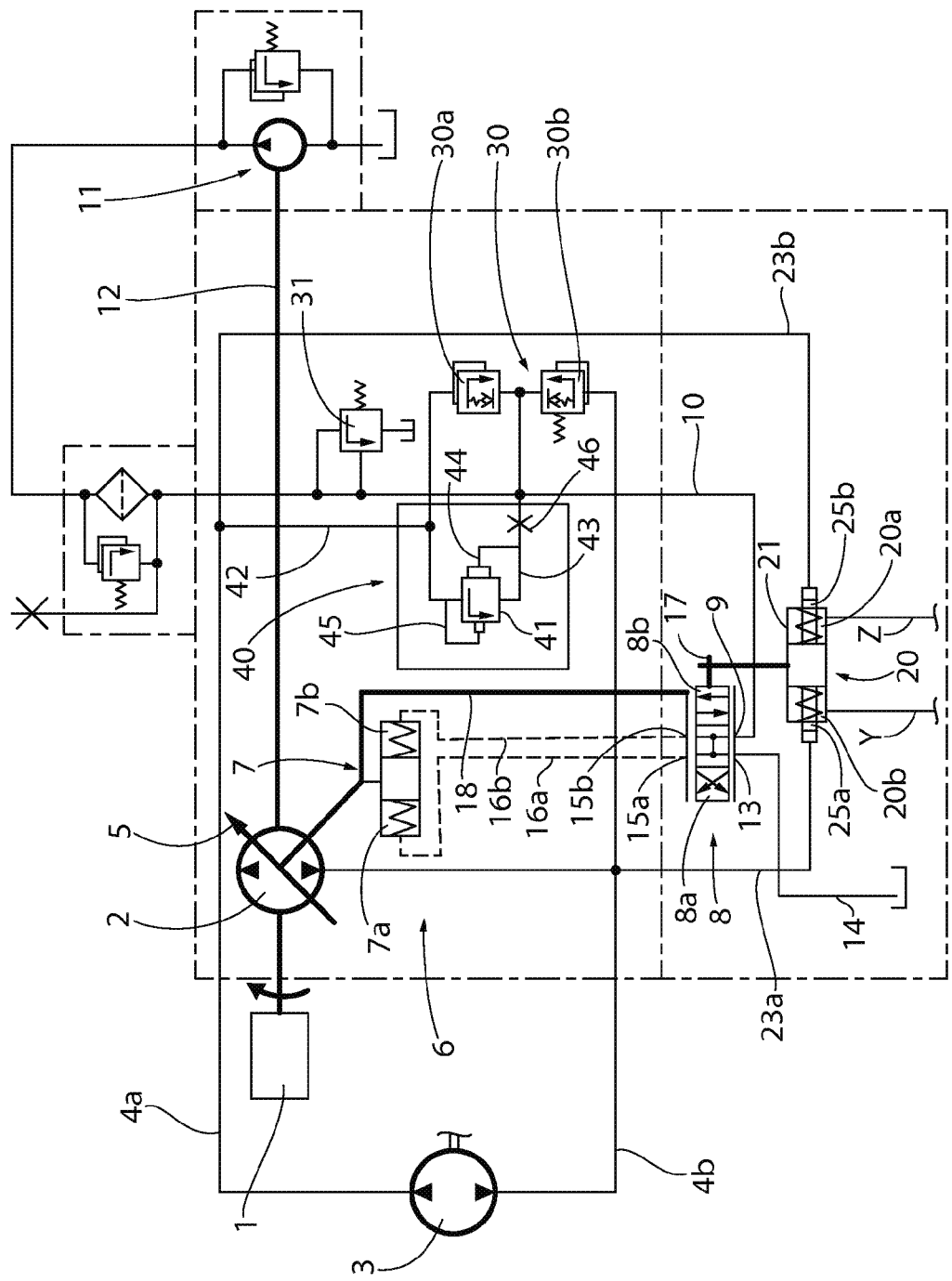
FIG. 1 is a first embodiment of the invention.

FIG. 1 shows the circuit diagram of a hydrostatic drive system in a closed circuit, for example, of a traction drive of a mobile work machine, such as a wheel loader.

A drive machine 1, such as an internal combustion engine, drives a hydrostatic positive displacement machine 2 which is in the form of a pump, for example, and is in communication in a closed circuit with at least one hydraulic user 3, such as a hydraulic motor. The user 3 is in communication in a manner not depicted in any further detail with a drive wheel or a drive axle of the work machine. The closed circuit forms a working circuit in which the positive displacement machine 2 delivers hydraulic fluid and includes a first hydraulic line 4*a* and a second hydraulic line 4*b*.

The positive displacement machine 2 is a variable displacement pump with a variable displacement volume and, therefore, a variable delivery volume, and to regulate the displacement volume has a displacement volume control mechanism 5, for example a swashplate in the form of a cradle of a positive displacement machine in the form of an axial piston machine, which for the adjustment is in operative connection with a control device 6. The positive displacement machine 2 can be adjusted, starting from a neutral position with zero displacement volume, in both directions to deliver into the hydraulic line 4a or into the hydraulic line 4b.

The control device 6 has a spring-centered variable displacement piston device 7 which is in an operative connection with the positive displacement volume control mechanism 5 and is provided with a first control pressure chamber 7a and a second control pressure chamber 7b. In the illustrated exemplary embodiment, the spring-centered variable displacement piston device 7 is in the form of a variable displacement piston with two control pressure chambers 7a, 7b that act in opposite directions. Alternatively, the variable displacement piston device 7 can be in the form of two variable displacement pistons that act in opposition, each with a control pressure chamber 7a and 7b, respectively.

A position-controlled control valve 8 in the form of a pilot valve is provided to control the pressurization of the control pressure chambers 7a, 7b of the variable displacement piston device 7. The control valve 8 has a feed pressure connection 9 which is in communication with a feed pressure supply line 10 of a feed pressure source 11, which can be in the form of a feed pressure pump, for example. The feed pressure source 11 in the form of a feed pressure pump is driven together with the positive displacement machine 2 by the drive machine 1. For this purpose a common drive shaft 12 is provided, by means of which the positive displacement machine and the feed pressure pump are in a driven connection with the drive machine 1. The feed pressure source 11 is in the form of a feed pressure pump which is operated in an open circuit, which pump sucks hydraulic fluid out of a reservoir and delivers it into the feed pressure supply line 10.

A container connection 13 of the control valve 8 is in communication by means of an outlet line 14 with a reservoir.

The control valve 8 also has a first control pressure connection 15a, which is in communication by means of a first control pressure line 16a with the first control pressure chamber 7a of the variable displacement piston device 7. A second control pressure connection 15b of the control valve 8 is in communication by means of a second control pressure line 16b with the second control pressure chamber 7b of the variable displacement piston device 7. The variable displacement piston device 7 and, therefore, the displacement volume control mechanism 5 are in an operative connection by means of mechanical coupling means 18 with the housing of the control valve 8 for the feedback of the current position of the positive displacement volume control mechanism 5.

The control element of the control valve 8 is in an operative connection for actuation by means of mechanical coupling means 17 with a pilot control device which, in the illustrated exemplary embodiment, is a slave piston 20. The slave piston 20 is located so that it can be displaced longitudinally in a slave cylinder 21 and has a first control pressure chamber 20a which is acted on by a first actuator signal Z and a second control pressure chamber 20b which is acted on by a second actuator signal Y. There is a spring in each of the control pressure chambers 20a, 20b to center the spring of the slave piston 20. In the illustrated exemplary embodiment, the actuator signals Z, Y are in the form of hydraulic actuation pressures.

On the slave piston 20 there is a first additional piston 25a which counteracts the actuator signal Z which is present in the first control pressure chamber 20a and is acted on by means of a line 23a by the pressure present in the second hydraulic line 4b. A second additional piston 25b is acted on by means of a line 23b by the pressure present in the first hydraulic line 4a and counteracts the actuator signal Y present in the second control pressure chamber 20b.

Figure 2:
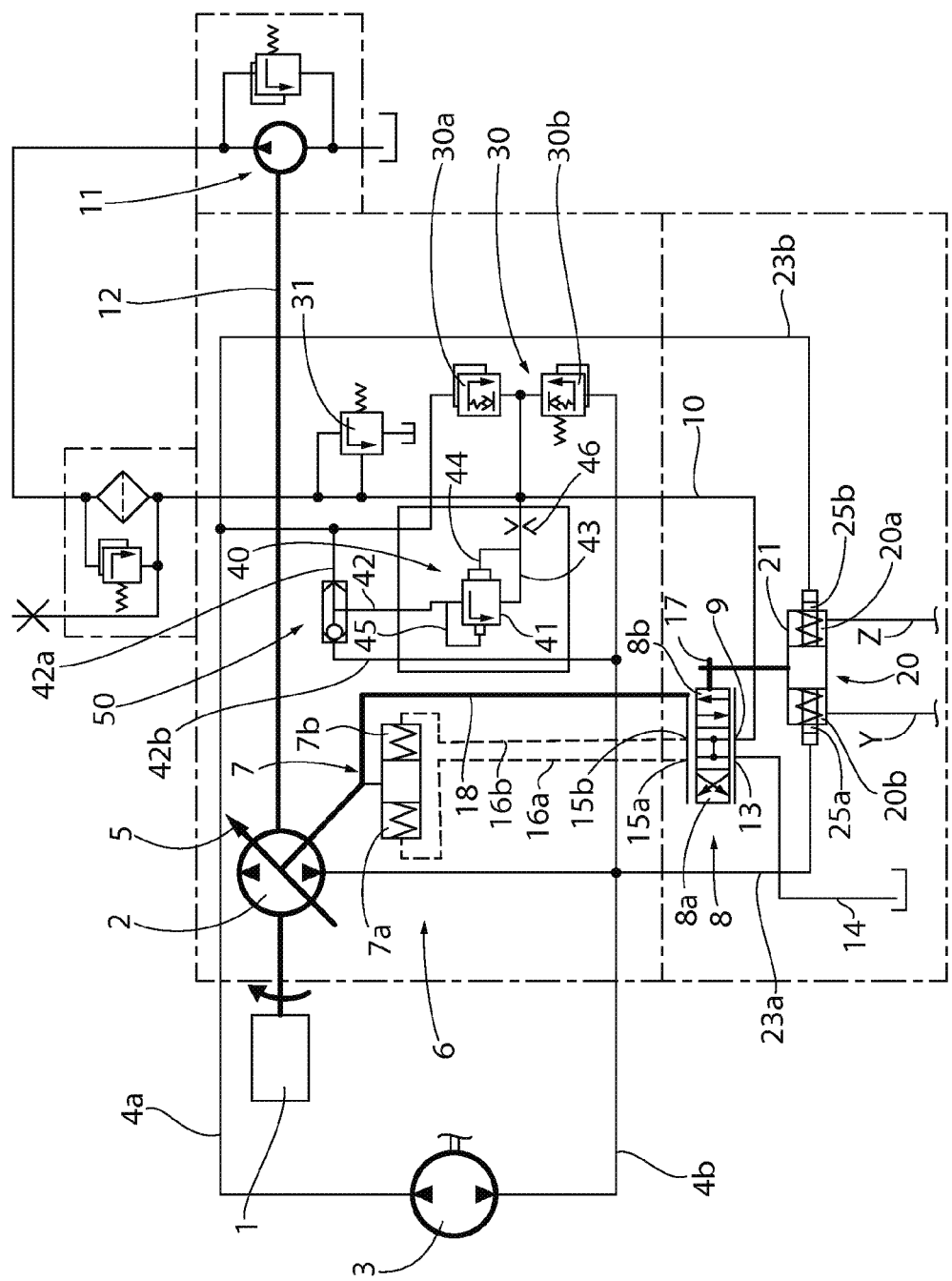
FIG. 2 is a variant of FIG. 1.

By an actuator signal Y which is present at the slave piston 20, the control valve 8 is actuated to the right in FIG. 2 toward a first switch position 8a, in which the control pressure line 16a is in communication with the feed pressure supply line 10 and the control pressure line 16b is in communication by means of the outlet line 14 with the reservoir. In this switch position 8a, the variable displacement piston device 7 is pivoted outwardly by an actuating pressure that is present in the control pressure chamber 7a toward an increase of the positive displacement volume, and the positive displacement volume control mechanism 5 pivots out, so that the positive placement machine 2 delivers into the first hydraulic fluid line 4a which therefore forms the high-pressure side of the closed circuit and the delivery side of the working circuit. The hydraulic line 4b therefore forms the low-pressure side of the closed circuit. The high pressure of the working circuit, which is present in the first hydraulic line 4a, is exerted via the line 23b on the additional piston 25b and counteracts the actuator signal Y on the slave piston 20 toward a reduction of the positive displacement volume of the positive displacement machine 2.

When an actuator signal Z is present at the slave piston 20, the control valve is moved toward the left in FIG. 2 toward a second switch position 8b, in which the control pressure line 16b is placed in communication with the feed pressure supply line 10 and the control pressure line 16a is in communication with the reservoir, whereby the variable displacement piston device 7 is pivoted outwardly by a control pressure which is present in the control pressure chamber 7b toward an increase of the displacement volume and the displacement volume control mechanism 5 is pivoted outwardly, such that the positive displacement machine 2 delivers into the second hydraulic line 4b, which therefore forms the high-pressure side of the closed circuit and the delivery side of the working circuit. The hydraulic line 4a thus forms the low-pressure side of the closed circuit. The high pressure of the working circuit present in the second hydraulic line 4b is available via the line 23 to the additional piston 25a and counteracts the actuator signal Z on the slave piston 20 toward a reduction of the displacement volume of the positive displacement machine 2.

The feed pressure source 11 formed by the feed pressure pump generates a constant feed pressure in the feed pressure supply line 10, which is protected by means of a feed pressure relief valve 31.

The control device 6 of the positive displacement machine 2, with which, when the control valve 8 is actuated, generates from the feed pressure in the feed pressure supply line 10 a control pressure in the control pressure chamber 7a or 7b for the adjustment of the positive displacement volume control mechanism 5, forms a user of the feed pressure source 11. An additional user of the feed pressure source 11 is formed by a backfeed device 30 of the closed circuit. The backfeed device 30 is also provided for the protection of the closed circuit and is formed by combined pressure relief-feeder valves 30a, 30b. The pressure relief-feeder valve 30a is in communication with the hydraulic line 4a and the pressure relief-feeder valve 30b is in communication with the hydraulic line 4b. The pressure relief-feeder valves 30a, 30b are connected to the feed pressure supply line 10 to backfeed hydraulic fluid into the closed circuit.

In the event of a reduction in the speed of rotation of the drive machine 1, the reduced drive speed of rotation of the feed pressure source 11, and thus a reduced delivery from the feed pressure source 11, can lead to a decline and drop of the feed pressure in the feed pressure supply line 10, for example if a mobile work machine in the form of a wheel loader drives into a pile of debris and the hydraulic work system is also actuated.

To relieve the load on the drive machine 1 under such operating conditions, to actuate the positive displacement machine 2 toward a reduction of the positive displacement volume and thereby swivel the displacement volume control mechanism 5 toward the neutral position, there is a swivel-back device 40 which is formed by a pressure sequence valve 41.

The pressure sequence valve 41 is in communication on the input side with the working circuit of the positive displacement machine 2 formed by the closed circuit, and makes it possible, in the event of a decline and thus a drop of the feed pressure in the feed pressure supply line 10 generated by the feed pressure source 11 below a limit pressure value, to act on the control device 6 with a volume current taken from the working circuit toward a reduction of the displacement volume and, thus, the displacement volume control mechanism 5 is swiveled back toward the neutral position with a volume flow covered from the working circuit.

When there is a sufficient feed pressure level above the limit pressure generated by the feed pressure source 11, the pressure sequence valve 41 closes the connection of the working circuit with the control device 6, so that the control device 6 and the displacement volume control mechanism 5 are supplied with hydraulic fluid from the feed pressure source 11.

The pressure sequence valve 41 in FIG. 1 is in communication on the input side by means of a branch line 42 with the first hydraulic line 4a. On the output side, the pressure sequence valve 41 in FIG. 1 is in communication by means of a branch line 43 with the feed pressure supply line 10 that leads to the control valve 8. A throttling device 46 is located in the branch line 43.

The pressure sequence valve 41 has a closed position in which the communication between the branch line 42 and the branch line 43, and, thus, the communication between the working circuit with the control 6, is blocked. The pressure sequence valve 41 is actuated toward the closed position by the feed pressure from the feed pressure source 11 present in the feed pressure supply line 10. For this purpose, a control line 44 is provided which, in the illustrated exemplary embodiment, branches off from the branch line 43 and leads to a control surface of the pressure sequence valve 41 that acts toward the closed position. The pressure sequence valve 41 is acted upon by the pressure in the working circuit toward an open position in which the branch line 42 is in communication with the branch line 43 and, thus, the control device 6 is in communication with the working circuit. For this purpose, a control line 45 is provided which, in the illustrated exemplary embodiment, branches off from the branch line 42 and leads to a control surface of the pressure sequence valve 41 that acts toward the open position. As a result of the appropriate size ratio of the two control surfaces of the pressure sequence valve 41, it is thereby possible to specify the limit pressure at which the pressure sequence valve 41 is actuated, in the event of a decline and drop in the feed pressure from the feed pressure source 11, from the closed position into the open position.

If the drive system illustrated in FIG. 1 is in an operating status in which the positive displacement machine 2 is delivering hydraulic fluid into the first hydraulic line 4a, which thereby forms the high-pressure side of the working circuit, there is a reduction in the speed of rotation of the drive machine 1. As a result of which, the delivery from the feed pressure source 11 decreases and there is a decline and drop of the feed pressure in the feed pressure supply line 10 below the limit pressure set on the pressure sequence valve 41. The pressure sequence valve 41 is actuated into the open position, in which the feed pressure level in the feed pressure supply line 10 is maintained by the volume flow extracted from the high-pressure side hydraulic line 4a. When the control valve 8 is actuated, an actuation of the variable displacement piston device 7 toward a reduction of the displacement volume and a swiveling back of the positive displacement volume control mechanism 5 is guaranteed with the volume flow extracted from the high-pressure side hydraulic line 4a of the working circuit.

In FIG. 1, the swivel-back device 40 formed by the pressure sequence valve 41 acts via the input-side connection with the hydraulic line 4a only for the direction of movement of the user 3 in which the positive displacement machine 2 delivers into the hydraulic line 4a and therefore the hydraulic line 4a forms the high-pressure side of the circuit. On a hydrostatic traction drive, the pressure sequence valve 41 is therefore active only for one direction of travel, e.g., forward travel, in which a mobile work machine in the form of a wheel loader runs into a pile of debris.

FIG. 2 shows a variation of FIG. 1 in which the pressure sequence valve 41 is associated on the input side with the two hydraulic lines 4a, 4b, so that in both directions of movement of the user 3, in which the positive displacement machine 2 delivers into the hydraulic line 4a and thus the hydraulic line 4a forms the high-pressure side of the circuit, or the positive displacement machine 2 delivers into the hydraulic line 4b and thus the hydraulic line 4b forms the high-pressure side of the circuit, a pivoting-back of the displacement volume control mechanism 5 is guaranteed by the extraction of a volume flow from the respective high-pressure side hydraulic line 4a or 4b of the working circuit.

In FIG. 2, in which the same components are identified by the same reference numbers, a selection device 50 is associated with the input side of the pressure sequence valve 41, which selection device 50 is in communication on the input side by means of branch lines 42a, 42b with the hydraulic lines 4a, 4b and on the output side via the branch line 42 with the input side of the pressure sequence valve 41.

In FIGS. 1 and 2, in the event of a drop in the feed pressure level below the pressure limit of the pressure sequence valve 41, the feed pressure in the feed pressure supply line 10 is maintained by means of the output-side communication of the pressure sequence valve 41 with the feed pressure supply line 10 and the extraction of the volume flow from the corresponding high-pressure side hydraulic line 4a or 4b of the working circuit, to guarantee the swiveling back of the displacement volume control mechanism 5.

By means of the branch line 43 connected with the feed pressure supply line 10 and the connection of the control line 44 to the branch line 43 in FIGS. 1 and 2, when the pressure sequence valve 41 is in the open position, the pressure generated by the pressure sequence valve 41 on the output side is reported back to the pressure sequence valve 41 and acts toward the closed position of the pressure sequence valve 41, so that the pressure generated by the pressure sequence valve 41 in the open position is limited to the level of the feed pressure.

Figure 3:
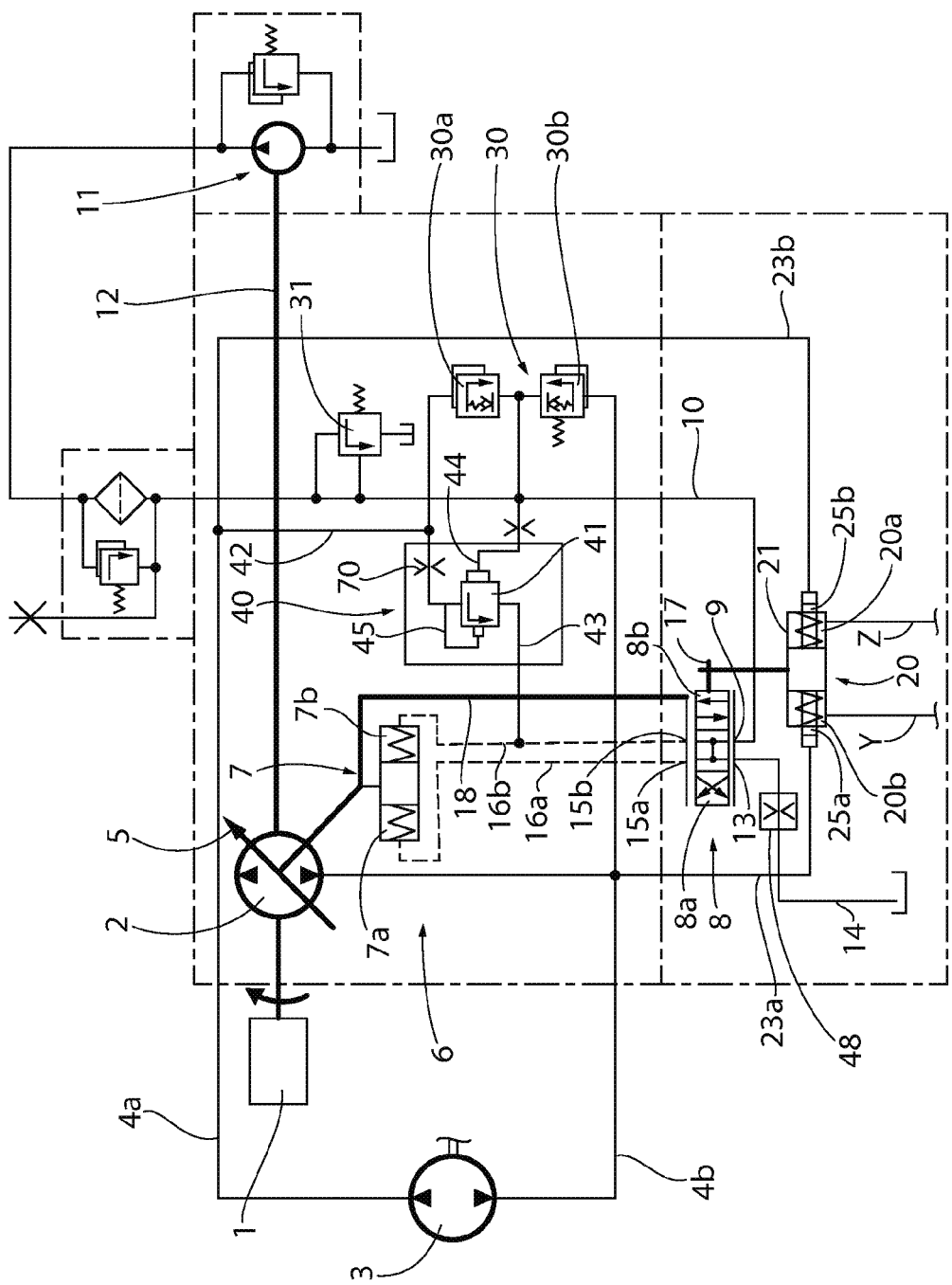
FIG. 3 is a second embodiment of the invention.

FIG. 3 shows an alternative embodiment in which, in the event of a decline and drop of the feed pressure level below the limit value of the pressure sequence valve 41, by means of an output-side connection of the pressure sequence valve 41 with the control pressure chamber 7b of the variable displacement piston device 7 that acts toward a reduction of the positive displacement volume, the positive displacement volume control mechanism 5 is swiveled back with the volume flow extracted from the corresponding high-pressure side hydraulic line 4a or 4b of the working circuit.

FIG. 3 shows a circuit in which for an action identical to the one illustrated in FIG. 1, in which for each direction of movement of the user 3 in which the positive displacement machine 2 delivers into the hydraulic line 4a and, therefore, the hydraulic line 4a forms the high-pressure side of the circuit, a swiveling back of the displacement volume control mechanism 5 is guaranteed.

Components that are identical to those illustrated in FIG. 1 are identified by the same reference numbers.

The pressure sequence valve 41 is connected, analogous to FIG. 1, by means of the branch line 42 on the input side to the hydraulic line 4a and by means of the branch line 45 is acted on by the pressure of the working circuit toward the open position and by means of the branch line 44 is acted on toward the closed position by the feed pressure in the feed pressure supply line 10.

In the operating condition in which the positive displacement machine 2 delivers into the hydraulic line 4a, the control valve 8 is acted on toward the first switch position 8a in which the control pressure line 16a is in communication with the feed pressure supply line 10 and the control pressure line 16b is in communication with the reservoir.

With the pressure sequence valve 41 opened in the event of a decrease of the feed pressure of the feed pressure source 11, to make possible a swiveling back of the displacement volume control mechanism 5 of the positive displacement machine by the volume flow extracted from the high-pressure hydraulic line 4a, the pressure sequence valve 41 is in communication on the output side by means of the branch line 43 with the control pressure line 16b which is connected to the reservoir. To be able to build up a control pressure in the control pressure chamber 7b and in the control pressure line 16b when the pressure sequence valve 41 is open, which swivels the displacement volume control mechanism 5 back into the neutral position, a throttling device 48 is located in the control pressure line 16b downstream of the connection of the branch line 43. The throttling device 48 is preferably in the form of an orifice.

In the exemplary embodiment illustrated in FIG. 3, the throttling device 48 is located in the discharge line 14, which in the switched position 8a of the control valve 8 is in communication with the control pressure line 16b.

A throttling device 70 is also located in the branch line 42 that leads to the input side of the pressure sequence valve 41. The throttling device 70 is preferably in the form of an orifice.

Figure 4:
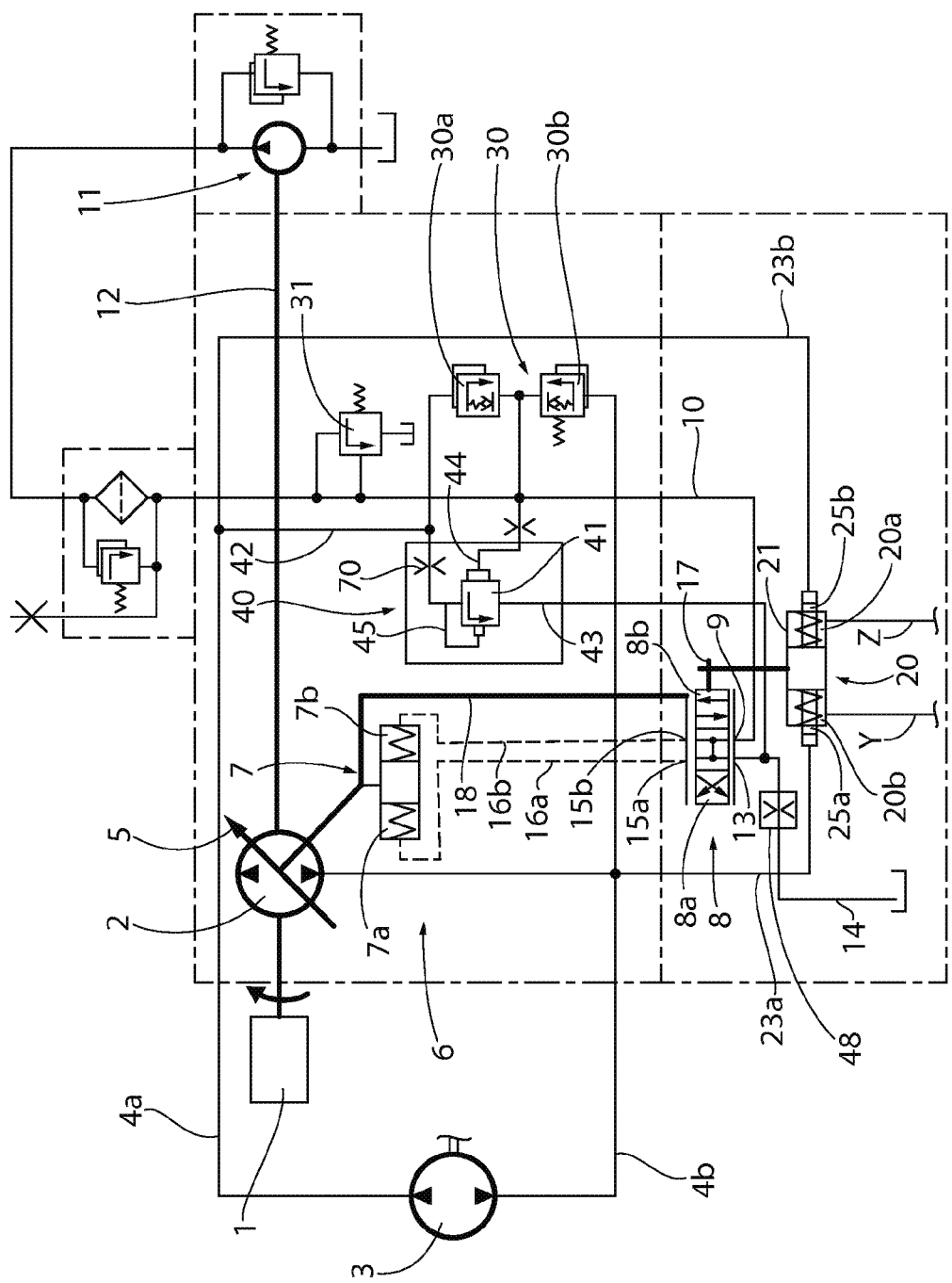
FIG. 4 is an additional embodiment of the invention.

Instead of the connection of the branch line 43 to the control pressure line 16b between the variable displacement piston device 7 and the control valve 8, the branch line 43 can alternatively—as illustrated in FIG. 4—be connected to the discharge line 14 upstream of the throttling device 48 and, thus, between the control valve 8 and the throttling device 48.

In the exemplary embodiment illustrated in FIG. 3 or FIG. 4, in which, in the event of a decrease in the feed pressure, the volume flow extracted from the high-pressure hydraulic line is immediately available via the opened pressure sequence valve 41 in the control pressure chamber 7b of the variable displacement piston device 7 which acts toward a reduction of the displacement volume to swivel the displacement volume control mechanism 5 back, a solution that acts in both directions of movement of the user can also be realized.

To ensure the swiveling back of the displacement volume control mechanism 5 in the second direction of movement, in which the hydraulic line 4b forms the high-pressure side of the user 3, an additional pressure sequence valve can be provided which is in communication on the input side with the hydraulic line 4b and on the output side with the control pressure line 16a.

Figure 5:
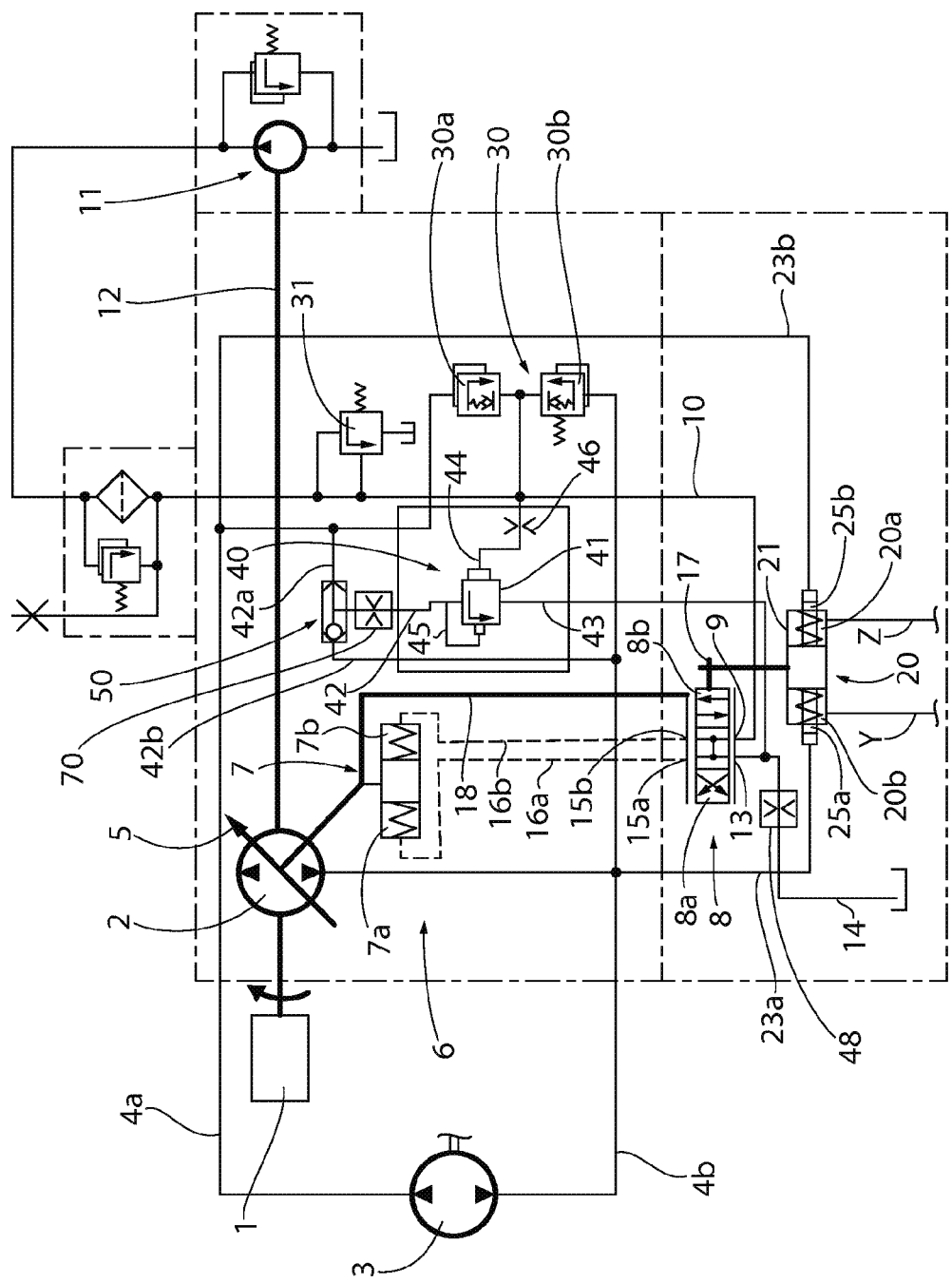
FIG. 5 is a variant of FIG. 4.

If a pressure sequence valve 41 is provided, which is connected on the output side by means of the branch line 43 to the discharge line 14 upstream of the throttling device 48, a solution that acts in both directions of movement can be achieved if the pressure sequence valve 41—as illustrated in FIG. 5—is connected by means of a selection device 50 on the input side with both hydraulic lines 4a, 4b. The selection device 50 is in communication on the input side by means of branch lines 42a, 42b with the hydraulic lines 4a, 4b and is in communication on the output side via the branch line 42, in which the throttling device 70 is located, with the input side of the pressure sequence valve 41.

In FIGS. 3-5, the throttling device 70 which is associated with the input side of the pressure sequence valve 41, together with the throttling device 48, forms a pressure divider circuit by means of which, when the pressure sequence valve 41 is in the open position, the pressure generated by the pressure sequence valve 41 is limited.

The swivel-back device 40 of the invention, with a pressure sequence valve 41 which becomes active when there is a decrease in the feed pressure of the feed pressure supply source 11, makes it possible with little construction effort and without a corresponding design of the springs of the variable displacement piston device 7, when there is a decline and drop of the feed pressure of the feed pressure supply source 11, to securely actuate the displacement volume control mechanism 5 of the positive displacement machine 2 toward a reduction of the displacement volume, even if there is an intrinsic torque on the displacement volume control mechanism 5.

The positive displacement machine 2 of the invention is not limited to the illustrated exemplary embodiment and the actuation of the control valve 8 with a pilot control device in the form of a slave piston 20. The control valve 8 can be actuated with any desired pilot control devices, for example by a mechanical actuation.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A hydrostatic positive displacement machine which is operable in a closed circuit and delivers hydraulic fluid into a working circuit, comprising:

a control device comprising a variable displacement piston device comprising a first control pressure chamber and a second control pressure chamber, wherein the control device is in an operative connection with a displacement volume control mechanism, wherein the control pressure chambers of the variable displacement piston device are connectable by a control valve with a feed pressure source or are relieved to a reservoir, wherein the positive displacement machine and the feed pressure source are driven by a drive machine, wherein the positive displacement machine includes a swivel-back device which, in the event of a decrease of feed pressure from the feed pressure source, provides actuation of the positive displacement machine' toward a reduction of a displacement volume, wherein the swivel-back device comprises at least one pressure sequence valve, which is in communication on an input side with the working circuit of the positive displacement machine, wherein in the event of a decrease in the feed pressure from the feed pressure source below a limit pressure, the pressure sequence valve supplies the control device of the positive displacement machine with hydraulic fluid from the working circuit, and wherein when the feed pressure from the feed pressure source is above the limit pressure, the pressure sequence valve blocks the connection between the working circuit and the control device, and the control device is supplied with hydraulic fluid from the feed pressure source.

2. The hydrostatic positive displacement machine as recited in claim 1, wherein the pressure sequence valve is actuated by the feed pressure from the feed pressure source toward a closed position in which the connection of the working circuit with the control device is blocked, and is actuated by the pressure of the working circuit toward an open position in which the working circuit is connected with the control device.

3. The hydrostatic positive displacement machine as recited in claim 1, wherein the pressure sequence valve is in communication on the output side with a feed pressure supply line that leads from the feed pressure source to the control valve.

4. The hydrostatic positive displacement machine as recited in claim 1, wherein the pressure sequence valve is in communication on the output side with a control pressure chamber of the variable displacement piston device, which acts toward a reduction of the displacement volume.

5. The hydrostatic positive displacement machine as recited in claim 4, wherein the pressure sequence valve is connected on the output side to a control pressure line which is connected with the control pressure chamber and is connected by means of the control valve with a reservoir.

6. The hydrostatic positive displacement machine as recited in claim 4, wherein the pressure sequence valve is connected on the output side to a discharge line of the control valve, which is connected with the reservoir.

7. The hydrostatic positive displacement machine as recited in claim 4, wherein a throttling device is located in a control pressure line or a discharge line of the control valve to build up a control pressure that acts toward a reduction of the displacement volume.

8. The hydrostatic positive displacement machine as recited in claim 4, wherein the pressure sequence valve is pressurized on the input side by a throttling device with the hydraulic fluid from the working circuit.

9. The hydrostatic positive displacement machine as recited in claim 1, wherein the positive displacement machine is a pump that is variable in both directions and is operated in a closed circuit, and wherein the swivel-back device is active in one direction of swiveling or both directions of swiveling of the pump.

10. A hydrostatic traction drive comprising a positive displacement machine as claimed in claim 1 in the form of a pump.

11. A mobile work machine with a hydrostatic traction drive as recited in claim 10.

12. The hydrostatic positive displacement machine as recited in claim 1, wherein the positive displacement machine is an axial piston machine with variable displacement volume.

13. The hydrostatic positive displacement machine as recited in claim 1, wherein the drive machine is an internal combustion engine.

14. The hydrostatic positive displacement machine as recited in claim 5, wherein a throttling device is located in a control pressure line or a discharge line of the control valve to build up a control pressure that acts toward a reduction of the displacement volume.

15. The hydrostatic positive displacement machine as recited in claim 6, wherein a throttling device is located in a control pressure line or a discharge line of the control valve to build up a control pressure that acts toward a reduction of the displacement volume.

16. The hydrostatic positive displacement machine as recited in claim 5, wherein the pressure sequence valve is pressurized on the input side by a throttling device with the hydraulic fluid from the working circuit.

* * * * *

UNITED STATES PATENT AND TRADEMARK OFFICE
CERTIFICATE OF CORRECTION

PATENT NO. : 9,328,728 B2  
APPLICATION NO. : 13/897654  
DATED : May 3, 2016  
INVENTOR(S) : Burkhard Stuermer Page 1 of 1

It is certified that error appears in the above-identified patent and that said Letters Patent is hereby corrected as shown below:

In the claims

Column 12, Line 67, Claim 1, delete "machine'" and insert -- machine --

Signed and Sealed this
Twenty-sixth Day of July, 2016

Michelle K. Lee
*Director of the United States Patent and Trademark Office*